(12) United States Patent
Fusselman et al.

(10) Patent No.: US 10,392,250 B2
(45) Date of Patent: Aug. 27, 2019

(54) REACTOR SYSTEM FOR PRODUCING SYNTHESIS GAS

(71) Applicant: GAS TECHNOLOGY INSTITUTE, Des Plaines, IL (US)

(72) Inventors: Steven P. Fusselman, Sacramento, CA (US); Stephen Arthur Yows, Sacramento, CA (US); Lisa Bayne, Sacramento, CA (US); Seth D. Hahn, Sacramento, CA (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 31 days.

(21) Appl. No.: 15/035,995

(22) PCT Filed: May 14, 2014

(86) PCT No.: PCT/US2014/037945
§ 371 (c)(1),
(2) Date: May 11, 2016

(87) PCT Pub. No.: WO2015/069319
PCT Pub. Date: May 14, 2015

(65) Prior Publication Data
US 2016/0332875 A1 Nov. 17, 2016

Related U.S. Application Data

(60) Provisional application No. 61/901,740, filed on Nov. 8, 2013.

(51) Int. Cl.
*C01B 3/48* (2006.01)
*C01B 3/36* (2006.01)
(Continued)

(52) U.S. Cl.
CPC ............... *C01B 3/48* (2013.01); *B01J 8/0285* (2013.01); *B01J 19/0006* (2013.01); *B01J 19/24* (2013.01); *C01B 3/36* (2013.01); *C10K 3/04* (2013.01); *B01J 2208/00362* (2013.01); *B01J 2208/00548* (2013.01); *B01J 2208/00628* (2013.01); *B01J 2219/00164* (2013.01);
(Continued)

(58) Field of Classification Search
CPC combination set(s) only.
See application file for complete search history.

(56) References Cited

U.S. PATENT DOCUMENTS 2,809,104 A * 10/1957 Strasser .................... C01B 3/22
252/373
3,820,964 A * 6/1974 Janka .......................... C10J 3/08
48/111
(Continued)

*Primary Examiner* — Kaity V Chandler
(74) *Attorney, Agent, or Firm* — Pauley Erickson & Kottis

(57) ABSTRACT

A reactor system for partial oxidation gasification includes a reactor vessel that has a defined reaction zone with a reaction zone inlet and a reaction zone outlet. An injector section is operable to inject reactants to the reaction zone inlet. A coolant injector is operable to inject a coolant adjacent a reaction zone outlet. A reactor vessel outlet is located downstream of the coolant injector. A controller is configured to operate the coolant injector with respect to cooling a synthesis gas discharged from the reaction zone outlet and upwardly shifting a ratio $H_2$:CO to a target ratio.

26 Claims, 2 Drawing Sheets

(51) Int. Cl.
  *B01J 8/02* (2006.01)
  *C10K 3/04* (2006.01)
  *B01J 19/00* (2006.01)
  *B01J 19/24* (2006.01)

(52) U.S. Cl.
  CPC ............ *B01J 2219/00202* (2013.01); *B01J 2219/00213* (2013.01); *B01J 2219/00231* (2013.01); *B01J 2219/00236* (2013.01); *B01J 2219/00238* (2013.01); *B01J 2219/24* (2013.01); *C01B 2203/025* (2013.01); *C01B 2203/0283* (2013.01); *C01B 2203/0877* (2013.01); *C01B 2203/1241* (2013.01); *C01B 2203/142* (2013.01); *C01B 2203/168* (2013.01); *C01B 2203/169* (2013.01); *C01B 2203/1623* (2013.01)

(56) References Cited

U.S. PATENT DOCUMENTS

| | | | | |
|---|---|---|---|---|
| 3,866,411 A | * | 2/1975 | Marion | F01K 23/068 60/780 |
| 3,920,717 A | * | 11/1975 | Marion | C07C 29/1518 252/373 |
| 3,929,429 A | * | 12/1975 | Crouch | C01B 3/363 252/373 |
| 4,081,253 A | * | 3/1978 | Marion | B01J 23/80 252/373 |
| 4,110,359 A | * | 8/1978 | Marion | B01J 23/80 252/373 |
| 4,141,696 A | * | 2/1979 | Marion | B01D 3/06 202/158 |
| 4,178,758 A | * | 12/1979 | Paull | C01B 3/36 165/134.1 |
| 4,402,710 A | * | 9/1983 | Stellaccio | C10J 3/485 252/373 |
| 4,559,061 A | * | 12/1985 | Jahnke | C10J 3/485 261/64.1 |
| 5,050,375 A | * | 9/1991 | Dickinson | C02F 11/086 110/238 |
| 5,401,282 A | * | 3/1995 | Leininger | C10J 3/06 252/373 |
| 5,415,673 A | * | 5/1995 | Hilton | C01B 3/32 252/373 |
| 6,033,456 A | * | 3/2000 | Jahnke | C01B 3/36 75/505 |
| 2003/0083391 A1 | * | 5/2003 | Jahnke | C10G 2/32 518/703 |
| 2008/0190026 A1 | * | 8/2008 | De Jong | C01B 3/363 48/205 |
| 2008/0275143 A1 | | 11/2008 | Malhotra | |
| 2010/0243961 A1 | * | 9/2010 | Hilton | C01B 3/22 252/373 |
| 2010/0317748 A1 | * | 12/2010 | Hassan | B01F 7/00766 518/700 |
| 2012/0005959 A1 | * | 1/2012 | Chen | C01B 3/36 48/61 |
| 2012/0055087 A1 | * | 3/2012 | Ullrich | C10J 3/487 48/61 |

* cited by examiner

REACTOR SYSTEM FOR PRODUCING SYNTHESIS GAS

CROSS-REFERENCE TO RELATED APPLICATION

This application claims priority to U.S. Provisional Patent Application No. 61/901,740, filed Nov. 11, 2013.

BACKGROUND

The conversion of natural gas (methane) or other hydrocarbon into a mixture of hydrogen and carbon monoxide (known as "synthesis gas" or "syngas") is often referred to as partial oxidation. In this process a hydrocarbon stream, such as natural gas, reacts with oxygen, to provide syngas that has hydrogen ($H_2$) and carbon monoxide (CO). Typically, the syngas is then used downstream in a Fischer-Tropsch process to convert the synthesis gas into a liquid hydrocarbon product that can be further processed to make liquid transportation fuels, such as diesel.

SUMMARY

A reactor system for partial oxidation generating synthesis gas according to an example of the present disclosure includes a reactor vessel that includes a defined reaction zone with a reaction zone inlet and a reaction zone outlet, an injector section that is operable to inject reactants to the reaction zone inlet, a coolant injector that is operable to inject a coolant downstream from the reaction zone outlet, and a reactor vessel outlet downstream of the coolant injector. A controller is configured to operate at least the coolant injector with respect to cooling of synthesis gas discharged from the reaction zone outlet and upwardly shifting the $H_2$:CO ratio in the synthesis gas to a target ratio.

In a further embodiment of any of the foregoing embodiments, the coolant injector is a water injector.

In a further embodiment of any of the foregoing embodiments, the coolant is water vapor and the controller is configured to control an amount of the water vapor injected with respect to cooling the synthesis gas discharged from the reaction zone outlet and upwardly shifting the ratio of $H_2$:CO in the synthesis gas to the target ratio.

In a further embodiment of any of the foregoing embodiments, the coolant is liquid water and the controller is configured to control an amount of the liquid water injected with respect to cooling the synthesis gas discharged from the reaction zone outlet and upwardly shifting the ratio of $H_2$:CO in the synthesis gas to the target ratio.

In a further embodiment of any of the foregoing embodiments, the defined reaction zone is bounded by an elongated sub-chamber within the reactor vessel.

In a further embodiment of any of the foregoing embodiments, the controller is configured to operate the coolant injector with respect to cooling the synthesis gas discharged from the reaction zone outlet and upwardly shifting the ratio of $H_2$:CO in the synthesis gas by at least 0.1 to the target ratio.

In a further embodiment of any of the foregoing embodiments, the target ratio is 1.9-2.1:1.

In a further embodiment of any of the foregoing embodiments, the controller is configured to operate the coolant injector also with regard to input water into the injector section.

In a further embodiment of any of the foregoing embodiments, the controller is configured to adjust input of the input water and input of the coolant with respect to the target ratio being within a defined range.

In a further embodiment of any of the foregoing embodiments, the injector section includes at least a natural gas input and an oxygen input.

In a further embodiment of any of the foregoing embodiments, the injector section includes a water recycle input from a location downstream of the reactor vessel.

In a further embodiment of any of the foregoing embodiments, the injector section includes a different, water purge input.

In a further embodiment of any of the foregoing embodiments, the injector section includes a by-product stream recycle input.

A partial oxidation gasification process according to an example of the present disclosure includes operating at a ratio $H_2$:CO of approximately 1.9-2.1:1 in synthesis gas.

In a further embodiment of any of the foregoing embodiments, the operating includes injecting reactants into a reaction zone inlet of a defined reaction zone within a reactor vessel to produce a stream of the synthesis gas discharged from a reaction zone outlet of the defined reaction zone. The synthesis gas has a first ratio $H_2$:CO and discharges a controlled amount of coolant into the stream at a location adjacent the reaction zone outlet. The controlled amount of coolant cools the stream of synthesis gas and upwardly shifts the first ratio $H_2$:CO to the ratio $H_2$:CO of approximately 1.9-2.1:1.

In a further embodiment of any of the foregoing embodiments, the coolant is water.

In a further embodiment of any of the foregoing embodiments, the coolant is water vapor.

In a further embodiment of any of the foregoing embodiments, the coolant is liquid water.

In a further embodiment of any of the foregoing embodiments, the discharging of the controlled amount of coolant is selected to upwardly shift the first ratio $H_2$:CO by at least 0.2.

In a further embodiment of any of the foregoing embodiments, the controller is configured to operate the coolant injector also with regard to input water into the injector section.

A further embodiment of any of the foregoing embodiments includes controlling an input of water into the reaction zone inlet with respect to maintaining the ratio $H_2$:CO of approximately 1.9-2.1:1.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
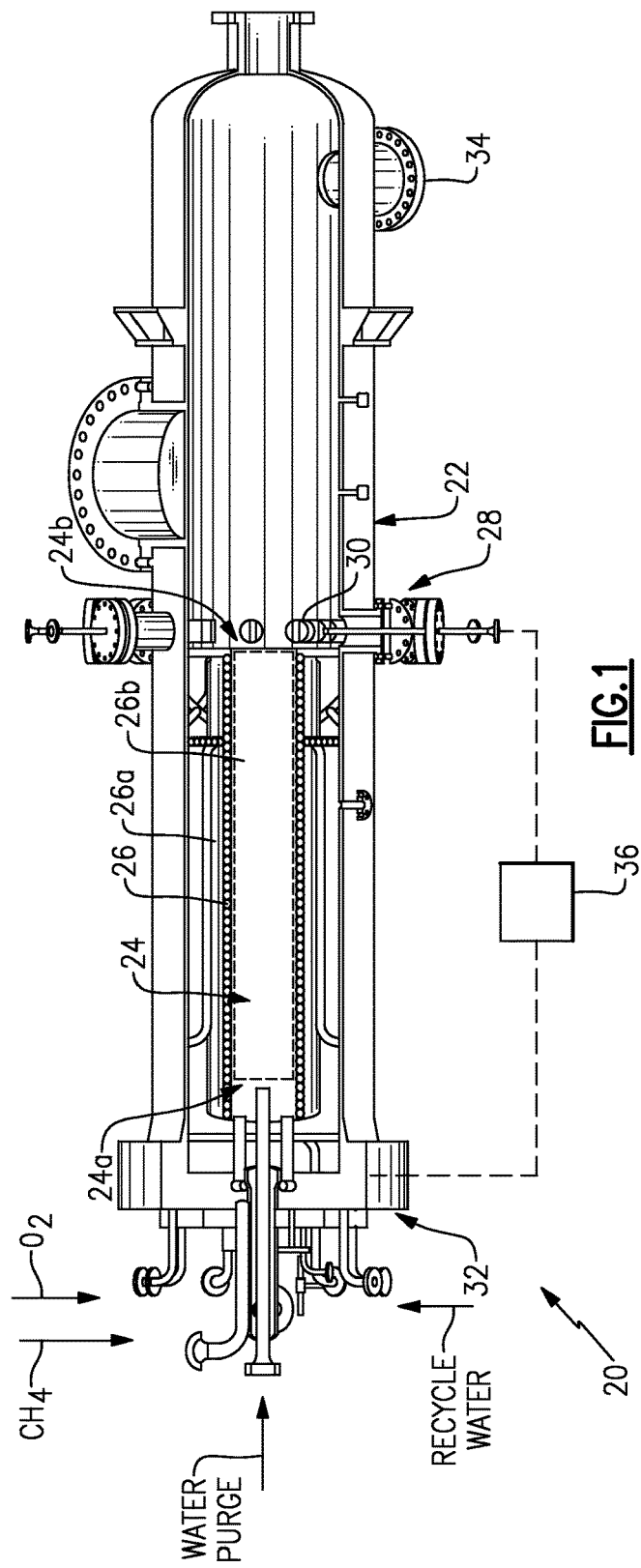
FIG. 1 illustrates an example reactor system for partial oxidation to generate synthesis gas.

FIG. 1 illustrates an example reactor system 20 for producing synthesis gas that includes carbon monoxide (CO) and hydrogen ($H_2$) using partial oxidation of natural gas (primarily methane, $CH_4$) or other hydrocarbon. In large-scale industrial uses, efficiency is the primary driver of the process/equipment design. In this regard, large-scale partial oxidation of natural gas is accompanied, for efficiency purposes, by downstream heat recovery from the produced synthesis gas, for example. Such large-scale systems require substantial capital costs and equipment, and therefore generally prohibit scaled-down, modular type versions for the conversion of smaller amounts of natural gas, such as stranded or waste natural gas. As will be described, the reactor system 20 includes features that permit use as a small-scale, modular type system for stranded or waste natural gas in the production of synthesis gas with a relatively high $H_2$:CO ratio, for example.

In the illustrated example, the reactor system 20 includes a reactor vessel 22 that is generally hollow and includes a defined reaction zone 24, wherein the partial oxidation of natural gas and other reactants, or a substantial portion thereof, occurs. The defined reaction zone 24 includes a reaction zone inlet 24a and a reaction zone outlet 24b. In this example, the defined reaction zone 24 is bounded, or defined by, an elongated sub-chamber 26 within the reactor vessel 22. For example, the sub-chamber 26 can include an outer wall 26a and an inner liner 26b that facilitates the control of the process temperature within the defined reaction zone 24. In this example, the sub-chamber 26 is spaced apart from the wall of the reactor vessel 22.

The reactor vessel 22 further includes a coolant injector 28 that has one or more injector nozzles 30 that are operable to inject a coolant, such as water, at a location downstream of the reaction zone outlet 24b. The reactor vessel 22 also includes an injector section 32 that is operable to inject reactants to the reaction zone inlet 24a. For partial oxidation of natural gas, the reactants at least include methane and oxygen. A reactor vessel outlet 34 is located downstream, relative to the flow of reactants and products through the reactor vessel 22, from the coolant injector 28. Thus, in operation, reactants are injected from the injector section 32 for reaction within the defined reaction zone 24 and are discharged through the reaction zone outlet 24b to the injector section 28 before being discharged from the reactor vessel 22 through the reactor vessel outlet 34.

A controller 36 is operably connected with at least the coolant injector 28 to control the operation thereof. In this regard, the coolant injector 28, and/or lines connected thereto for supplying coolant, can include valves, flow meters and the like, which are also operably connected with the controller 36, such that the controller 36 can control injection of the coolant from the injector nozzles 30 into the reactor vessel 22. The controller 36 can also be operably connected with the injector section 32 to control the input of reactants into the reaction zone 24.

The controller 36 is configured, with hardware, software, or both, to operate the coolant injector 28 with respect to cooling of synthesis gas that is discharged from the reaction zone outlet 24b and upwardly shifting the $H_2$:CO ratio to a target value. For example, the controller 36 can control the amount of coolant, the phase of the coolant, or both to cool the synthesis gas that is discharged from the reaction zone outlet 24b by a desired amount in order to upwardly shift the $H_2$:CO ratio of the synthesis gas discharged from the reaction zone outlet 24b to the target value.

In one example, the synthesis gas that is discharged from the reaction zone outlet 24b has a $H_2$:CO ratio of approximately 1.8 and the controller 26 operates the coolant injector 28 with respect to cooling the synthesis gas such that the ratio upwardly shifts by at least 0.1, to approximately 1.9-2.1:1. The $H_2$:CO ratio of approximately 1.9-2.1:1 is suitable for the synthesis gas to be used in downstream equipment or processes, such as a Fischer-Tropsch process, to produce hydrocarbon fuel. In contrast, in a large-scale industrial partial oxidation process, hot synthesis gas discharged from a reaction zone is fed directly into a separate heat exchanger for thermal energy recovery to enhance system efficiency and improve plant economics. However, on a small scale, modular type of system where heat recovery is not needed and would otherwise be wasted, the controller 36 and coolant injector 28 function to cool the synthesis gas in situ in the reactor vessel 22 to thus upwardly shift the $H_2$:CO ratio to the target value. The synthesis gas discharged from the reactor vessel outlet 34 is therefore already at a ratio that is suitable for further downstream processes, without a need for thermal recovery or additional separate Water Gas Shift reactors or pressure swing absorption equipment to adjust the ratio. In the large scale system, the relatively cool synthesis gas from the thermal recovery heat exchanger has to be further processed in a separate piece of equipment to shift the $H_2$:CO ratio prior to input into a downstream Fischer-Tropsch process. The system 20 can therefore be used as a small-scale, modular piece of equipment to process low cost stranded or waste natural gas without high capital costs and additional equipment.

In further embodiments, the controller 36 can also be configured to control the injection of reactants from the injector section 32 with respect to the temperature of the synthesis gas discharged from the reaction zone outlet 24b and the target ratio. For example, the controller 36 can control the amounts of reactants injected to thus control the temperature and $H_2$:CO ratio in the synthesis gas discharged from the reaction zone outlet 24b. Given the controlled temperature and ratio in the synthesis gas discharged from the reaction zone outlet 24b, the controller 36 can then control the amount, phase, or both, of the coolant (e.g., water) injected from the coolant injector 28 to obtain and maintain the target $H_2$:CO ratio or ratio range.

As an example, liquid water can be injected for a greater cooling influence on the synthesis gas discharged from the reaction zone outlet 24b, due to the energy associated with vaporization. Alternatively, some or all of the water can be injected as a vapor if less cooling is needed. In this regard, some or all of the injector nozzles 30 can be configured to spray or vaporize the water, while other injector nozzles 30 can be configured for liquid water injection. In another alternative, the injector nozzles 30 can be adjustable between liquid and vapor injection.

Additionally, the injector section 32 can include a water purge input, a water recycle input (shown schematically in FIG. 1), a by-product stream such as waste gases or heavy hydrocarbons, or any combination of these. The water recycle input is received from a process downstream from the reactor vessel 22, such as a Fischer-Tropsch process. The water recycle input can include contaminants. In large scale systems, waste water from Fischer-Tropsch is considered to be contaminated and is expunged from the system for treatment. However, in the system 20, such waste water can be recycled back into the reactor vessel 22 as a further input to control the ratio of $H_2$:CO in the synthesis gas discharged from the reaction zone outlet 24b prior to coolant injection. At startup or in the case where there is no recycled water available, and if there is a need to input water into the reactor vessel 22, the controller 26 can utilize the water purge as a water input to facilitate control of the ratio of $H_2$:CO and/or facilitate the reduction in fouling of the injector section 32. If recycled water is used and injected into the reaction zone 24, the reactions and relatively high temperatures can destroy the contaminants, such as alcohols, waxes, oils, aromatics, etc. that can be present in the recycled water. Thus, the reactor system 20 also serves to eliminate, at least in part, the need for waste water treatment because the waste water can be recycled back into the reactor vessel 22.

Figure 2:
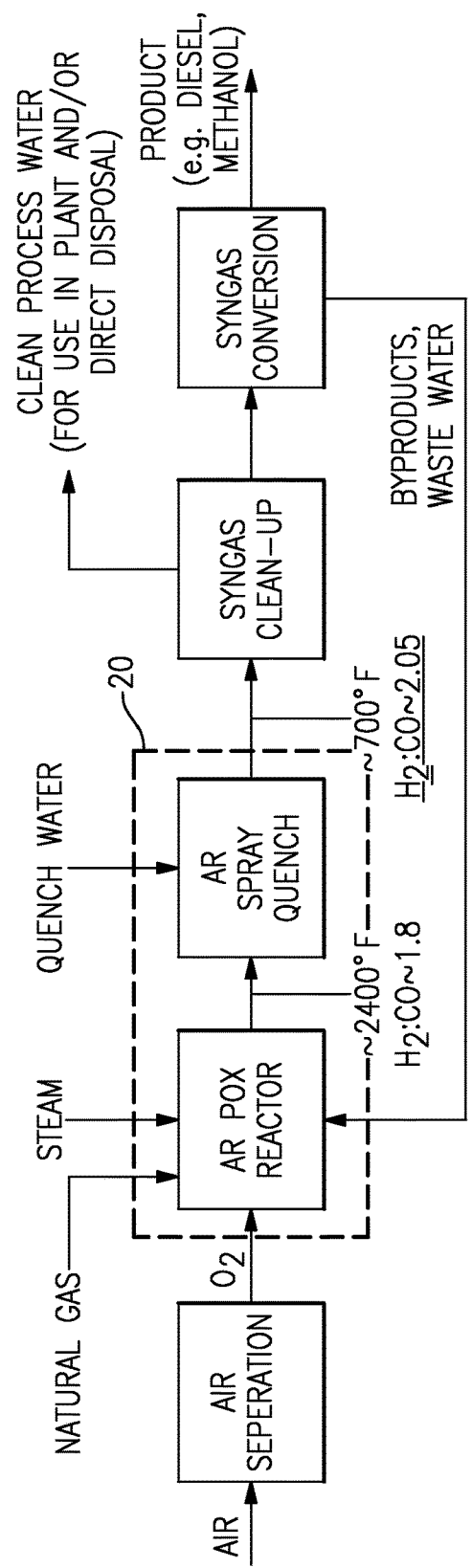
FIG. 2 is a schematic flow chart of a process utilizing the reactor system of FIG. 1 for partial oxidation to generate synthesis gas.

FIG. 2 schematically shows a flow chart of a partial oxidation method or process that can be utilized with the reactor system 20. The process shown is one example of operating the reactor system 20 at a $H_2$:CO ratio of approximately 1.9-2.1:1 in the synthesis gas. In this example, the synthesis gas discharged from the reaction zone outlet 24b is at a temperature of approximately 2400° F. and has a $H_2$:CO ratio of approximately 1.8. Upon injection of the coolant and reduction in the temperature of the synthesis gas, the $H_2$:CO ratio upwardly shifts to approximately 2.05 and a temperature of approximately 700° F. In this regard, the controller 36 controls the reactants input into the reactor vessel 22, along with the amount and/or phase of the coolant injected from the coolant injector 28 to allow "fine tuning" of the process and good control over the $H_2$:CO ratio in the synthesis gas discharged from the reactor vessel outlet 34.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A partial oxidation reactor generating synthesis gas, comprising:
a reactor vessel including therein a defined reaction zone having a reaction zone inlet and a reaction zone outlet wherein the reaction zone is catalyst free, an injector section to inject reactants including a hydrocarbon stream and oxygen to the reaction zone inlet to produce a stream of synthesis gas, wherein the injector section includes a hydrocarbon stream injector and an oxygen injector, a coolant injector to inject a coolant downstream from the reaction zone outlet to cool the stream of synthesis gas discharged from the reaction zone outlet, and a reactor vessel outlet downstream of the coolant injector for discharging the synthesis gas;
a controller in operational control with at least the coolant injector to control injection of the coolant to cool the stream of synthesis gas discharged from the reaction zone outlet and upwardly shift the $H_2$:CO ratio in the synthesis gas to a target ratio;
wherein reaction between hydrocarbon and oxygen in the reaction zone generates heat; and
wherein the temperature of the synthesis gas as the synthesis gas discharges from the reaction zone outlet is approximately 2400° F. and wherein the controller controls injection of coolant downstream of the reaction zone outlet to cool the synthesis gas to approximately 700° F.

2. The reactor system as recited in claim 1, wherein the coolant injector is a water injector.

3. The reactor system as recited in claim 1, wherein the coolant is water vapor and the controller controls an amount of the water vapor injected to cool the synthesis gas discharged from the reaction zone outlet and upwardly shift the ratio of $H_2$:CO in the synthesis gas to the target ratio.

4. The reactor system as recited in claim 1, wherein the coolant is liquid water and the controller controls an amount of the liquid water injected to cool the synthesis gas discharged from the reaction zone outlet and upwardly shift the ratio of $H_2$:CO in the synthesis gas to the target ratio.

5. The reactor system as recited in claim 1, wherein the controller controls injection of the coolant to cool the synthesis gas discharged from the reaction zone outlet and upwardly shift the ratio of $H_2$:CO in the synthesis gas by at least 0.1 to the target ratio.

6. The reactor system as recited in claim 1, wherein the target ratio is 1.9-2.1:1.

7. The reactor system as recited in claim 1, wherein the controller is also in operational control with regard to input water into the injector section.

8. The reactor system as recited in claim 7, wherein the controller is in operational control of the input water and input of the coolant with respect to the target ratio being within a defined range.

9. The reactor system as recited in claim 1, wherein the injector section includes at least a natural gas input and an oxygen input.

10. The reactor system as recited in claim 9, wherein the injection section includes a water recycle input from a location downstream of the reactor vessel.

11. The reactor system as recited in claim 10, wherein the injection section includes a different, water purge input.

12. The reactor system as recited in claim 10, wherein the injection section includes a by-product stream recycle input.

13. The reactor system as recited in claim 1, wherein the defined reaction zone is bounded by an elongated sub-chamber within the reactor vessel, the sub-chamber including an outer wall and an inner liner to facilitate control of a temperature within the defined reaction zone.

14. The reactor system as recited in claim 1, wherein the hydrocarbon stream comprises methane.

15. The reactor system as recited in claim 1, wherein the injector section additionally comprises a water recycle input whereby contaminate-containing water received from a process device downstream from the reactor vessel is introduced into the reactor vessel.

16. The reactor system as recited in claim 15, wherein contaminates present in the water recycle input are destroyed in the reactor system.

17. A partial oxidation gasification process comprising:
operating the reactor of claim 1 at a ratio of $H_2$:CO of approximately 1.9 2.1:1 in synthesis gas.

18. The process as recited in claim 14, wherein the operating includes:
injecting the reactants including a hydrocarbon stream and oxygen into the reaction zone inlet of the defined reaction zone within the reactor vessel producing heat and a stream of the synthesis gas having a first ratio $H_2$:CO;
discharging the stream of synthesis gas from a reaction zone outlet of the defined reaction zone; and
discharging a controlled amount of coolant into the stream at a location adjacent the reaction zone outlet, the controlled amount of coolant cooling the stream of synthesis gas and upwardly shifting the first ratio $H_2$:CO to the ratio $H_2$:CO of approximately 1.9-2.1:1.

19. The process as recited in claim 18, wherein the hydrocarbon stream comprises methane.

20. The process as recited in claim 18, wherein the injecting step comprises injecting all of the hydrocarbon reactants entering the synthesis gas generating partial oxidation reactor system.

21. The process as recited in claim 18, wherein the coolant is water.

22. The process as recited in claim 18, wherein the coolant is water vapor.

23. The process as recited in claim 18, wherein the coolant is liquid water.

24. The process as recited in claim 18, wherein the discharging of the controlled amount of coolant is selected to upwardly shift the first ratio $H_2$:CO by at least 0.2.

25. The process as recited in claim 18, wherein the controller is configured to operate the coolant injector also with regard to input water into the injector section.

26. The process as recited in claim 18, further comprising controlling an input of water into the reaction zone inlet with respect to maintaining the ratio $H_2$:CO of approximately 1.9-2.1:1.

* * * * *